United States Patent [19]

Long

[11] Patent Number: 6,074,680
[45] Date of Patent: Jun. 13, 2000

[54] METHOD FOR KILLING BACTERIA IN MEAT

[75] Inventor: John B. Long, Sarasota, Fla.

[73] Assignee: Hydrodyne Incorporated, Hato Rey, Puerto Rico

[21] Appl. No.: 09/035,942

[22] Filed: Mar. 6, 1998

Related U.S. Application Data

[60] Provisional application No. 60/040,085, Mar. 7, 1997.

[51] Int. Cl.[7] ............................................. A23L 3/00
[52] U.S. Cl. ............................................ 426/238; 426/521
[58] Field of Search ................................ 426/238, 237, 426/521, 240; 99/451; 422/20

[56] References Cited

U.S. PATENT DOCUMENTS

| | | | |
|---|---|---|---|
| 2,456,909 | 12/1948 | Brasch | 426/240 |
| 2,963,369 | 12/1960 | Urbain | 426/240 |
| 3,492,688 | 2/1970 | Godfrey | 426/238 |
| 3,594,115 | 7/1971 | Wesley et al. | 426/238 |
| 3,711,896 | 1/1973 | Guberman et al. | 426/238 |
| 4,458,153 | 7/1984 | Wesley | 250/435 |
| 5,273,766 | 12/1993 | Long | 426/238 |
| 5,328,403 | 7/1994 | Long | 426/238 |
| 5,368,724 | 11/1994 | Ayers et al. | 210/110 |
| 5,397,961 | 3/1995 | Ayers et al. | 315/111.21 |
| 5,588,357 | 12/1996 | Tomikawa et al. | 99/451 |

FOREIGN PATENT DOCUMENTS

WO 93/03622  3/1993  WIPO .
WO 97/45697  10/1997  WIPO .

*Primary Examiner*—George C. Yeung
*Attorney, Agent, or Firm*—Sheridan Neimark; Browdy and Neimark

[57] ABSTRACT

Bacteria on and in meat, for example hamburger, is killed by subjecting the meat to an explosive shock front pressure wave propagated through an inert liquid medium at a rate of at least 6100 meters per second.

16 Claims, No Drawings

METHOD FOR KILLING BACTERIA IN MEAT

This application is based on and claims priority of U.S. Provisional Application 60/040,085 filed Mar. 7, 1997.

FIELD OF INVENTION

The present invention is directed to an improved system for killing bacteria in meat.

BACKGROUND OF INVENTION

Prior methods and technology having to do with killing bacteria in meat include the application of chemicals, e.g. ethyl alcohol; the application of live steam to the meat surface; and the application of radiation, especially hard gamma radiation. The application of chemicals such as alcohol has the disadvantage of being effective only as regards the surface bacteria, and possibly altering the taste of the meat. Live steam undesirably changes the color of the surface of the meat, turning it to a brownish color, and in any event has limited penetration. Radiation will kill all of the bacteria on and in the meat without altering the appearance of the meat, but some of the molecules of the meat are altered by radiation, with resultant fear that this alteration may produce undesirable effects, e.g. cancer, in humans; moreover, radiation is simply not presently accepted by the U.S. public.

Most bacteria occurs naturally only on the meat surface. With most forms of cooking, heat is applied to the meat surface, and through conduction is transferred throughout the meat. Experience has shown that the meat surface becomes hot enough in most instances to kill the bacteria, but in many cases the inside of the meat does not reach a microorganism killing temperature. With unground meat, e.g. steaks, this is normally not a problem, because the inner portion of the meat is likely to be bacteria-free. However, with ground meat the bacteria from the surface is distributed throughout the meat. Thus, the largest problem with bacteria occurs with ground meat, and there have been some recent occurrences of pathogenic E-Coli bacteria in insufficiently cooked hamburger killing persons who had eaten such hamburgers. Of the three prior methods of killing bacteria mentioned above, only radiation can kill the bacteria within the meat.

Killing microorganisms on and in meat is obviously important from a health standpoint, inasmuch as some of the bacteria can be life-threatening. However, killing all or reducing the amount of bacteria on the meat surface also greatly increases the shelf life of the meat. This is of large economic importance.

U.S. Pat. Nos. 5,328,403 and 5,273,766, both in the name of John B. Long, are directed to the treatment of meat by exposing it to an explosive force. While these patents are primarily directed to the use of such an explosive force in order to tenderize the meat, such an explosive force also kills microorganisms on and in the meat. Experiments conducted on meat using the system of the aforementioned U.S. patents '403 and '766 have shown that about 90% of the surface bacteria on the meat samples were killed. It would, of course, be desirable to increase the percentage of bacteria killed by such a process.

SUMMARY

It is, accordingly, an object of the present invention to overcome deficiencies in the prior art, such as indicated above.

It is another object of the present invention to provide a process which increases the percentage of bacteria killed by subjecting meat to an explosive force, and especially a process which results in killing well over 90% of the bacteria in and on meat, and up to 100%.

Briefly, the present invention is achieved by providing a faster moving shock wave than heretofore been provided according to the examples of the aforementioned Long patents.

The present invention operates through the entire thickness of the meat, and is as effective in killing bacteria inside the meat as it is on the surface. The present invention is an improvement in that the application of an appropriate explosive charge can kill well over 90%, e.g. at least 92% and preferably at least 96% of the bacteria up to 100%.

DETAILED DESCRIPTION OF EMBODIMENTS

In accordance with the present invention, a chemical explosive with high brisance is preferably used, which is more effective in rupturing the membranes of the microorganisms residing in the meat. When a detonator initiates an explosive reaction in an explosive material, the speed with which the reaction traverses the explosive is referred to as the "burn rate". The faster the burn rate, the higher the brisance, and the more of the explosive energy that is expended in shattering the surrounding environment. The present invention is based on the concept of using an explosive having a fast burn rate which is more effective in killing bacteria. In this instance, "fast" would be at least 6100 meters per second, and preferably at least 6300 m/s, most preferably about 7000 m/s or more.

Several already known explosives have burn rates in excess of 6100 meters per second, these being single molecule chemical explosives. HMX, RDX, PETN and Primasheet™ are examples of these, and are preferred. Two-part chemical explosives can also be used; in a two-part chemical explosive, neither chemical by itself is an explosive, and the two must be mixed before an explosive is achieved. Nitromethane by itself, if it can be detonated, has a burn rate of approximately 6705 meters per second. Nitromethane can be sensitized by adding a small amount, e.g. about 5%, of a sensitizer chemical like ethylene diamine, which is also a liquid, and this produces an explosive mixture which can be detonated with a standard blasting cap. This is a preferred two-part explosive for use in the present invention.

Other known sensitizers include urea, isopropyl nitrate, monomethylamine nitrate and hexamethylenetetramine mononitrate.

Other so-called insensitive explosives can also be used safely, including compositions of 80–90% RDX or HMX, the explosive powders or crystals being thoroughly coated with plasticized polymer (20%–10%) and wherein the HMX is usually in a bimodal crystal form (see "Explosives and Propellants (Explosives)"; Vol. 10, 4th Ed. *Encyclopedia of Chemical Technology,* especially pp. 55–56). Primasheet™ (Ensign-Bickford Co.) has a burn rate of 23000 ft. per second, i.e. 7010 meters per second; the aforementioned HMX has a burn rate of 8800 meters per second; and PETN has a burn rate of 8260 meters per second.

Except for the use of an explosive having a fast burn rate as defined above, preferably a so-called insensitive explosive for safety purposes, the present invention in certain preferred embodiments is otherwise carried out according to the method of the above-identified U.S. patents '403 and '766, the contents of which are incorporated herein. For best results, the explosive discharge should take place sufficiently below the upper level of the water in the meat supporting tank so that the gas bubble created by the explosive discharge will not break through the upper surface of the liquid before the shock wave passes through the meat, is reflected from the meat supporting surface and again reaches the gas bubble from which it will be reflected again so that a third shock wave will then pass through the supported meat.

Instead of using a batch system as shown in the above-identified U.S. patents '403 and '766, the process of the present invention can be carried out using an intermittent, semi-continuous or continuously operating apparatus using various types of conveyor systems. In these types of operations, especially those which are scaled down in size whereby a smaller quantity of meat is treated with each discharge, it is desirable to replace chemical explosives with means for producing an explosion by electrical discharge. Thus, a bank of capacitors can hold a large electrical charge which can be released to under water electrodes as a method for producing an underwater shock wave. A judicious arrangement of capacitors, switches and optional reflectors can produce a shock wave having a pressure rise rate and shape with respect to pressure and time which will match those waves produced by chemical explosives.

It is therefore within the scope of the present invention to produce an explosion generated shock wave by either electric discharge or chemical explosives wherein the shock wave moves at a rate of at least 6100 meters per second, and preferably faster. In either case, however, it is important consistent with the aforementioned U.S. patents that the meat be so supported so that a reflected shock wave crosses the incoming wave to produce optimum effects.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

What is claimed is:

1. In a method of treating meat comprising supporting the meat adjacent a shock wave reflective surface in an inert liquid, and subjecting said meat to an explosive shock wave propagated through the inert liquid, the shock wave then reflecting back from the shock wave reflective surface through the meat, the improvement wherein:
    the shock wave moves through said inert liquid at a rate of at least 6100 meters per second, wherein at least 92% of the bacteria on and in the meat is killed.

2. A method according to claim 1 wherein the rate of shock wave movement through said inert liquid is at least 6300 meters per second.

3. A method according to claim 1 wherein the rate of shock wave movement through said inert liquid is at least 7000 meters per second.

4. A method according to claim 3 wherein said meat comprises ground beef.

5. A method according to claim 1 wherein said shock wave is generated by explosion of a chemical explosive.

6. A method according to claim 1 wherein said shock wave reflective surface is at least partially hemispherically shaped.

7. A method according to claim 1 wherein said meat is in the form of ground meat.

8. A method according to claim 7 wherein said ground meat comprises ground beef.

9. A method according to claim 1 wherein said shockwave is generated by electrical discharge.

10. A method of treating meat to kill bacteria in meat, comprising
    supporting the meat on a meat-supporting surface; providing an inert liquid adjacent said meat; creating an explosive discharge within said inert liquid so as to create a shock-wave moving at a rate of at least 6,100 meters per second which propagates through the inert liquid and through the meat supported by said surface; and reflecting back said shock-wave from a shock-wave reflective surface adjacent said inert liquid and through the meat, wherein at least 92% of the bacteria on and in the meat is killed.

11. A method according to claim 10 wherein the rate of shock wave movement through said inert liquid is at least 6,300 meters per second.

12. A method according to claim 10 wherein the rate of shock wave movement through said inert liquid is at least 7,000 meters per second.

13. A method according to claim 10 wherein said explosive discharge comprises an explosion of a chemical explosive.

14. A method according to claim 10 wherein said explosive discharge comprise an electrical discharge.

15. A method according to claim 10 wherein said shockwave reflective surface is at least partially hemispherically shaped.

16. A method according to claim 10 wherein said meat is in particulate form.

\* \* \* \* \*